United States Patent
Gonsior

(12) 
(10) Patent No.: US 6,651,697 B2
(45) Date of Patent: Nov. 25, 2003

(54) FITTING, ESPECIALLY A TAP COCK

(75) Inventor: Wolfgang Gonsior, Bodolz (DE)

(73) Assignee: Xomox International GmbH & Co., Lindau/Bodensee (DE)

( * ) Notice: Subject to any disclaimer, the term of this patent is extended or adjusted under 35 U.S.C. 154(b) by 0 days.

(21) Appl. No.: 10/301,823

(22) Filed: Nov. 22, 2002

(65) Prior Publication Data

US 2003/0121554 A1 Jul. 3, 2003

Related U.S. Application Data

(63) Continuation of application No. PCT/EP01/05772, filed on May 21, 2001.

(30) Foreign Application Priority Data

May 23, 2000 (DE) ..................................... 200 09 126 U
May 24, 2000 (DE) ..................................... 200 09 184 U

(51) Int. Cl.[7] ........................................... F16K 11/085
(52) U.S. Cl. .................................. 137/625.32; 251/144
(58) Field of Search ....................... 137/625.32; 251/144, 251/192

(56) References Cited

U.S. PATENT DOCUMENTS

| 2,191,815 A | * | 2/1940 | Clade .......................... 251/192 |
| 2,721,722 A | * | 10/1955 | Lostutter, Jr. ................ 251/192 |
| 2,892,610 A | * | 6/1959 | Graham ........................ 251/192 |
| 3,286,735 A | | 11/1966 | Yindrock |
| 3,442,490 A | | 5/1969 | Smith |
| 3,554,488 A | | 1/1971 | Alexander |
| 3,561,487 A | * | 2/1971 | Reed, Jr. ................ 137/625.32 |
| 3,661,355 A | * | 5/1972 | Rawstron et al. ............ 251/144 |
| 3,999,567 A | | 12/1976 | Robinson |
| 4,187,881 A | * | 2/1980 | Kull ........................ 137/625.31 |
| 4,304,252 A | * | 12/1981 | Stanton ....................... 137/240 |
| 4,318,531 A | | 3/1982 | Carlson |
| 4,422,473 A | | 12/1983 | Polley |
| 4,431,162 A | * | 2/1984 | Carlson ....................... 251/144 |
| 4,518,149 A | | 5/1985 | Gardner |
| 5,445,187 A | | 8/1995 | Farquhar |

FOREIGN PATENT DOCUMENTS

FR  2803834  1/2000

* cited by examiner

Primary Examiner—John Fox
(74) Attorney, Agent, or Firm—Crowell & Moring LLP

(57) ABSTRACT

A fitting, particularly a tap cock, for receptacles such as tank trucks or containers, which includes a housing (2), having an inlet opening (12) and an outlet opening (14), and a rotatable body (4) with a through passageway (48), having an inflow opening (50) and an outflow opening (52). The rotatable body (4) is rotatably disposed in the housing such that when rotated into an open position it facilitates fluid communication between the inlet opening (12) and the outlet opening (14) and when rotated into a closed position, it shuts off such communication. The fitting of the invention enables a large throughput during loading and unloading of the receptacle with little structural change by providing the rotatable body (4) with a second inflow opening (54) having a cross-section at least approximately the same size as the first inflow opening (50), and by providing the housing (2) with a bearing ring (46) or a seat ring (82) in the vicinity of the second inflow opening (54).

17 Claims, 4 Drawing Sheets

FITTING, ESPECIALLY A TAP COCK

CROSS REFERENCE TO RELATED APPLICATIONS

This application is a continuation of international patent application no. PCT/EP01/05772, filed May 21, 2001, designating the United States of America and published in German as WO 01/90620, the entire disclosure of which is incorporated herein by reference. Priority is claimed based on Federal Republic of Germany patent applications no. DE 200 09 126.3, filed May 23, 2000, and no. DE 200 09 184.0, filed May 24, 2000.

BACKGROUND OF THE INVENTION

The present invention relates to a fitting for receptacles such as tank cars or containers comprising a housing, having an inlet opening and an outlet opening, and a rotatable body with a through passageway, having an inflow opening and an outflow or discharge opening, in which the rotatable body is rotatably arranged in the housing such that in an open position it provides communication between the inlet opening and the outlet opening, and in a closed position is blocks communication between the inlet opening and the outlet opening.

A fitting of this type, whose rotating body is constructed essentially as spherical and which is positioned in the region of an opening in the bottom of the receptacle of a tank vehicle, is known from U.S. Pat. No. 3,286,735. A shaft is coupled to the spherical rotating body, which, after the installation of the fitting in the receptacle, is located therein, the fitting having a relatively large height. Seat rings, which press against the spherical external surface of the rotating body and are fixed in the housing using adjustable annular sleeves, are provided in the region of the inlet openings for sealing. To preset and/or set the sealing force of the seat rings, the sleeves described are rotatably mounted in the housing via threaded connections, the sleeves described being moved independently of one another from both sides in relation to the rotating body in opposite directions to elevate the sealing force. After the installation of the fitting in the receptacle, the setting may be performed in the inside of the receptacle, or the fitting must be uninstalled from the receptacle.

Furthermore, a fitting is known, from U.S. Pat. No. 4,518,149, whose rotating body is constructed as a plug and is mounted rotatably around an essentially horizontal rotational axis and in the housing using a bushing made of plastic, particularly polytetrafluoroethylene, the seal in relation to the housing furthermore resulting from using the bushing. In a first embodiment, the fitting is constructed as a plug cock whose housing has an essentially vertically arranged passage having an inlet opening and an outlet opening. The plug has a through hole having an inflow opening and an outflow opening, which, in the open position, align with the inlet opening and the outlet opening of the housing. The cross-section of the through hole of the plug and the outlet opening of the housing are smaller than the cross-section of a connection branch for a line or a hose for loading or filling. As a consequence of the reduction in cross-section described, relatively long times must be accepted for loading and unloading and/or for filling or emptying the tank receptacle. It is noted here that, during unloading or emptying, the fluid or the medium stored in the receptacle flows in through the inlet opening of the housing and the inflow opening of the rotating body and flows out through the outflow opening of the rotating body and the outlet opening of the housing. In contrast, the flow direction is reversed in the case of loading or filling, so that the medium or fluid flows in through the outlet opening and the outflow opening and reaches the receptacle through the inflow opening of the rotating body and the inlet opening of the housing. Furthermore, the plug contains a small lateral opening, which is located in the region of the internal bottom surface of the receptacle in the open position, in order to allow it to be completely emptied. The rate of flow is, however, not influenced by this small opening. By enlarging the diameter of the plug, the shortcoming caused by the reduction in cross-section may be counteracted, however, in this way the overall volume and particularly the overall height of the fitting is enlarged disadvantageously.

In a further embodiment, the rotating body is constructed as a sphere having a through-hole with a correspondingly enlarged cross-section. The overall volume and, above all, the overall height, in the vertical direction and/or in the direction of the through opening of the housing, are, however, considerable in this embodiment. Furthermore, significant expense is associated with the setting and/or the adjustment of the test pressure of sealing elements, and consequently the sealing force on the spherical rotating body, in the mounted state of the fitting, since these measures must be carried out inside the tank.

SUMMARY OF THE INVENTION

It is an object of the invention to provide an improved fitting of the aforementioned type.

A further object of the invention is to provide a fitting that can be constructed at reasonable cost.

Another object of the invention is to provide a fitting with a small overall volume and/or overall height in which the sealing force of the seat rings may be easily set.

It is also an object of the invention to provide a fitting in which only a low operating torque is necessary for rotating the rotating body.

These and other objects are achieved in accordance with the present invention by providing a fitting for a fluid receptacle, said fitting comprising a housing having two inlet openings and an outlet opening, and a rotatable body rotatably disposed in said housing, said rotatable body having a through passage with two inflow openings and an outflow opening, and said rotatable body when rotated into an open position, communicating the inlet openings with the outlet opening, and when in a closed position, blocking communication between the inlet openings and the outlet opening; said two inflow openings having cross-sections which are at least approximately equally large, and said housing having a bearing ring in the vicinity of the second inflow opening or a seat ring in the vicinity of the second inlet opening; wherein said rotatable body is constructed as a plug having a conical outer surface, and a predetermined small annular gap exists between the plug outer surface and an associated conical inner surface of a hole in the housing in which the plug is inserted; said housing having a seat ring in the vicinity of the outlet opening, against which seat ring the conical outer surface of the rotating body presses against to form a seal; wherein an axial adjustment of the rotatable body and consequent adjustment of the sealing pressure of the seat ring is controlled by adjustment of a clamping ring after the fitting is installed in the receptacle, and wherein the adjustment of the clamping ring is performable outside of the receptacle.

The fitting according to the present invention, which particularly may be constructed as a plug cock, is distinguished by simple and nonetheless reliable construction and, in the open position of the rotating body, ensures a large flow rate of the medium and therefore short loading times and/or unloading times. The cross-sections of the openings of the housing and the rotating body described are selected and tailored to the cross-section of the connection flange in such a way that, during loading and unloading, there is unhindered free flow of the medium or fluid, without a disadvantageous reduction of cross-section. The rotating body contains a second inflow opening having a comparatively large cross-section, through which a significant proportion of the medium flowing through the rotating body flows in the open position of the rotating body. The cross-section of the second inflow opening is essentially at least as large as the cross-section of the first inflow opening. Furthermore, the cross-section of the outlet opening of the housing is advantageously at least approximately as large as the cross-section of the opening of the connection flange. Furthermore, the housing contains a bearing ring or sealing ring which, at least in the open position of the rotating body, is essentially coaxial to the second inflow opening described.

In a separate embodiment, the housing contains, in the vicinity of the outflow opening of the rotating body, on the outflow side, and/or toward the outside of the receptacle, a seat ring and/or a sealing ring, due to which a lower operating torque and/or a lower torque for rotating the body during opening or closing is ensured. This is particularly true in comparison to a plug cock, whose plug is mounted so it rotates and forms a seal in a bushing of the housing. In a further embodiment, both inflow openings of the rotating body are positioned diametrically opposed and preferably coaxial to one another, like both of the assigned inlet openings of the housing, the respective cross-sections of the openings being essentially equally large. In this case, the axes of the openings described are essentially orthogonal to the rotational axis of the rotating body, preferably constructed as a plug, each of the two inlet openings of the rotating body being assigned a seat ring positioned in the housing.

In all embodiments of the fitting according to the present invention, the sealing forces of the seat rings and the sealing elements are set in the region of the outside of the receptacle, so that in the mounted state of the fitting, setting or adjustment may be performed at any time as necessary, without anything further.

To satisfy safety requirements, a lever for operating the rotating body and/or a flange positioned on the outflow side and/or in the region of the outside of the receptacle or similar, is provided with predetermined breaking points, so that in case of a possible accident, the fitting remains undamaged and therefore fully functional and sealed. The fitting according to the present invention allows direct and safe mounting and operation directly in the receptacle. Furthermore, the fitting is distinguished by high cost effectiveness, since comparatively few components are necessary. Furthermore, low installation height is of particular significance, a high flow rate of the medium with which the receptacle is to be filled or which is to be emptied from the receptacle nonetheless being ensured. Furthermore, by using standardized components, high requirements for quality and functional reliability are fulfilled. The fitting is preferably integrated into a manhole cover and may be connected easily to the receptacle, particularly by welding.

BRIEF DESCRIPTION OF THE DRAWINGS

The invention will be described in further detail hereinafter with reference to illustrative preferred embodiments shown in the accompanying drawing figures in which.

DETAILED DESCRIPTION OF PREFERRED EMBODIMENTS

Figure 1:
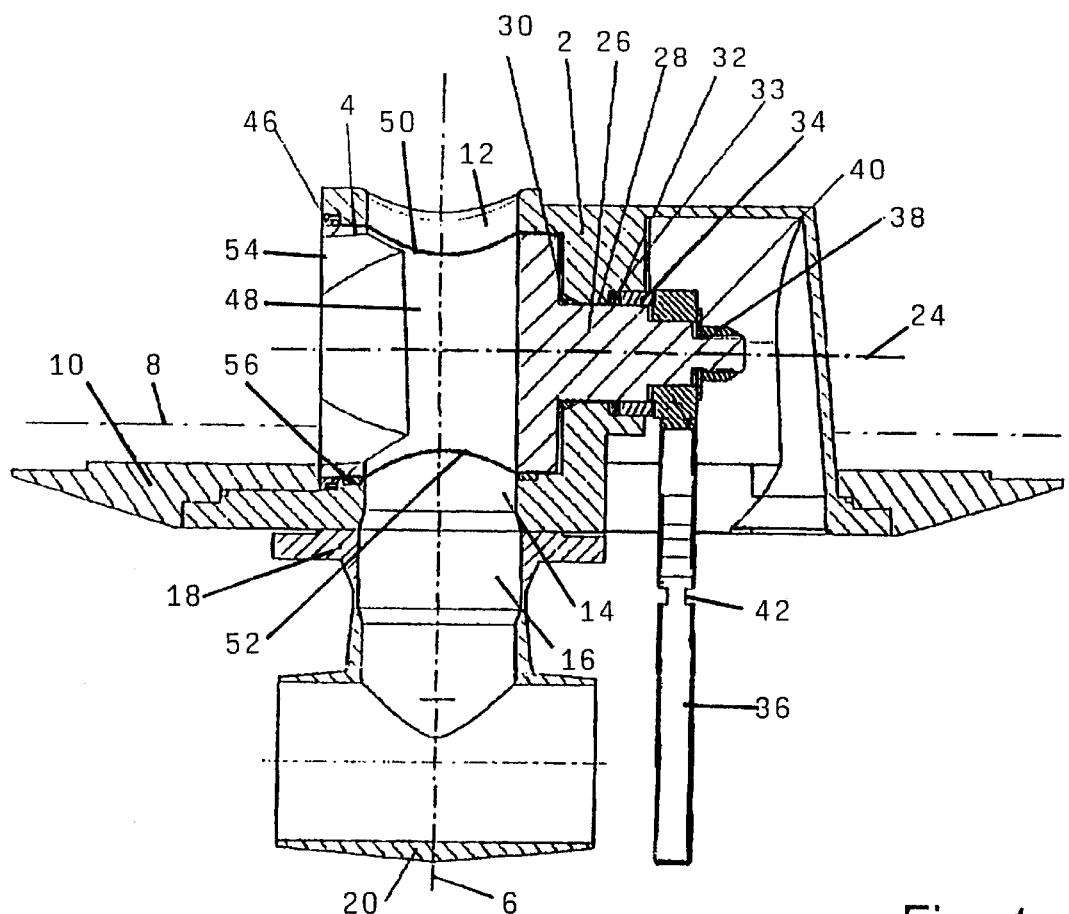
FIG. 1 is a sectional view through a first illustrative embodiment, with the rotating body in the open position and the passage being enabled.

FIG. 1 shows a section through the fitting having a housing 2 and a rotating body 4, in a sectional plane through longitudinal axis 6. The fitting is positioned in the region of an opening in the bottom, which is indicated using broken line 8, of a receptacle or tank and is connected permanently to this in a suitable way to form a seal. For this purpose, a welded cover 10 is expediently provided in a manhole of bottom 8, to which the housing is expediently connected via a flange. Inside the receptacle, i.e., above bottom 8, there is an inlet opening 12 coaxial to longitudinal axis 6. Furthermore, housing 2 contains an outlet opening 14 at the bottom, toward the outside, which is adjoined by a passage 16 of a connection body of a connection flange or connection branch. Furthermore, a tee-piece 20 is connected to connection body 18. The cross-section of outlet opening 14 is at least approximately as large as the cross-section of passage 16, without there being a reduction in cross-section.

Rotating body 4, constructed as a plug, is rotatably mounted in housing 2 around a rotational axis 24, which is at least approximately orthogonal to longitudinal axis 6, preferably arranged vertically. As may be seen, a shaft 26 of rotating body 22 penetrates a hole 28 of the housing, mounting of rotating body 4 being selected via shaft 26, which is connected in one piece with the rotating body. A delta ring 30, which partially projects into hole 28 described, is provided in the transition region from rotating body 4 to shaft 26. A seal to the outside is produced using gland rings 32, 33, an axial application of pressure being provided via a clamping ring 34.

Furthermore, a lever 36 is connected to shaft 26 for its operation so that they rotate together, gland rings 32, 33 able to be set and/or adjusted via the lever and clamping ring 34 using setting means 38, in the form of an adjustment nut and a disk 40. Furthermore, lever 36 has a predetermined breaking point 42, which is as close as possible to welded cover 10 and/or tank bottom 8. The connection of connection body 18, particularly using screws (not shown here), to housing 2, is also advantageously constructed as an predetermined breaking point, so that in the event of a possible accident, the fitting is not damaged and remains completely functional and sealed.

Plug 4, which has a conical outer surface, is positioned in a hole 44, also conical, of housing 2 and mounted using a bearing ring 46. A bushing for mounting and sealing typically provided in plug cocks is not present. Rather, there is play and/or a predetermined small ring gap between the conical outer surface of plug 4 and the inner surface of conical hole 44, and because of this there is no friction and/or torque to overcome for operating and/or rotating plug 4. Plug 4 is mounted using bearing ring 46 and using the mounting of shaft 26, connected in one piece, in the region of hole 28 of housing 2. In comparison to known plug cocks, a low operating torque is therefore assured.

Rotating body 4 contains a through hole 48 having a first inflow opening 50 and an outflow opening 52 diametrically opposed thereto. Furthermore, rotating body 4 contains a second inflow opening 54, which discharges into through hole 48 and which is positioned at least approximately coaxially to rotational axis 24. As may be seen, bearing ring 46, which is also essentially coaxial to rotational axis 24, is positioned radially on the outside in housing 2 in the region of second inflow opening 54. Second inflow opening 54 forms a direct connection between the inside of the receptacle and through hole 48 of rotating body 4. During unloading or emptying of the receptacle, the medium therefore flows not only through first inflow opening 50, but also simultaneously through second inflow opening 54 into through hole 48 of rotating body 4. The cross-section of second inflow opening 54 is selected as large and is at least approximately of the same magnitude as the cross-section of first inflow opening 50. Due to the large cross-sectional area of inflow opening 54, a significant proportion of the medium therefore flows through it. The flow resistance for rotating body 4 and the medium flowing through the fitting overall is therefore reduced to a minimum.

In order to seal in the closed position, in which rotating body and/or plug 4 is rotated by 90° around rotational axis 24, a preferably soft-sealing seat ring or sealing ring 56 is provided in the region of outlet opening 14 of housing 2, which presses against the conical outer surface of plug 4 to form a seal, and is made of synthetic resin material, particularly polytetrafluoroethylene. Soft-sealing seat ring 56 is positioned in the region of conical inner surface 28 of housing 2 and accordingly deformed conically and/or spherically. It is to be noted that in the open position, through hole 48 and outflow opening 50 of rotating body 4 are coaxial to longitudinal axis 6 and outlet opening 14, while in the closed position, through hole 48 and outflow opening 50 assume a position rotated by approximately 90° in relation to rotational axis 24 and seat ring 54 presses against the associated, completely closed part of the outer surface of rotating body 4 to form a seal. Conical hole 44 of housing 2 opens from the right part of housing 2 and/or hole 28, as shown in the drawing, in the direction toward longitudinal axis 6 and/or toward opposing bearing ring 46 and discharges there into the inside of the receptacle. Correspondingly, rotating body 4 has a conical outer surface which opens from the region of shaft 26 toward the free end of rotating body 4. By tightening the setting or adjustment means, particularly constructed as adjustment nut 38, the rotating body is, as shown in the drawing, pulled to the right in relation to housing 2 and/or into hole 44, the test pressure and finally the sealing force of seat ring 56 being selected and set as necessary. Since the adjustment means and/or adjustment nut 38 are accessible from the outside of the receptacle, the setting and/or adjustment of the sealing force of seat ring 56 may be performed without difficulty when fitting is mounted and permanently connected to the container. During the described adjustment, the position and the sealing force of gland rings 32, 33 in relation to shaft 26 are also determined or selected.

Figure 2:
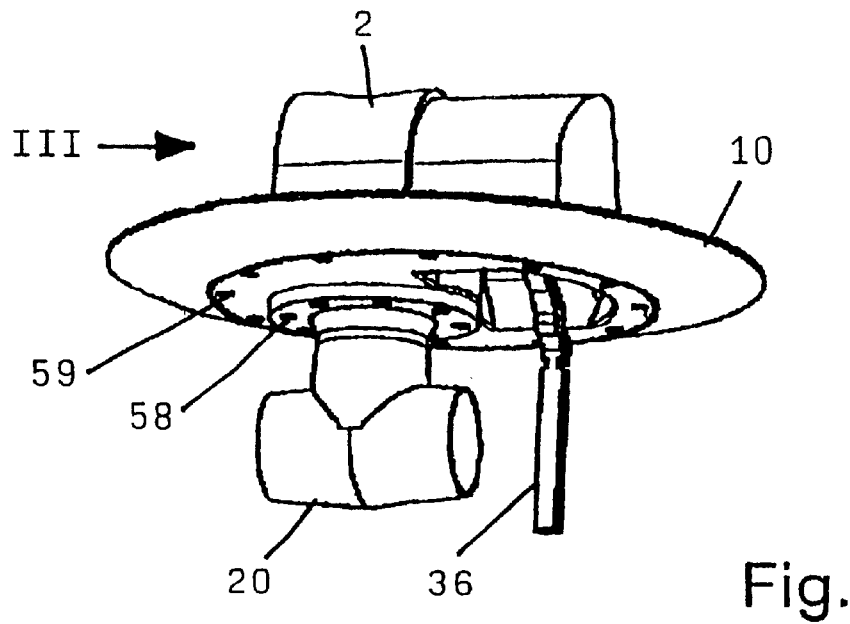
FIGS. 2 and 3 are further views of the fitting of FIG. 1.

In a perspective view, FIG. 2 shows the fitting at an angle from below with tee-piece 20 and operating lever 36. As may be seen, connection flange 18 is connected to the lower flange of housing 2 using screws 58. The lower housing flange is also connected to welded cover 10 using screws 59.

Figure 3:
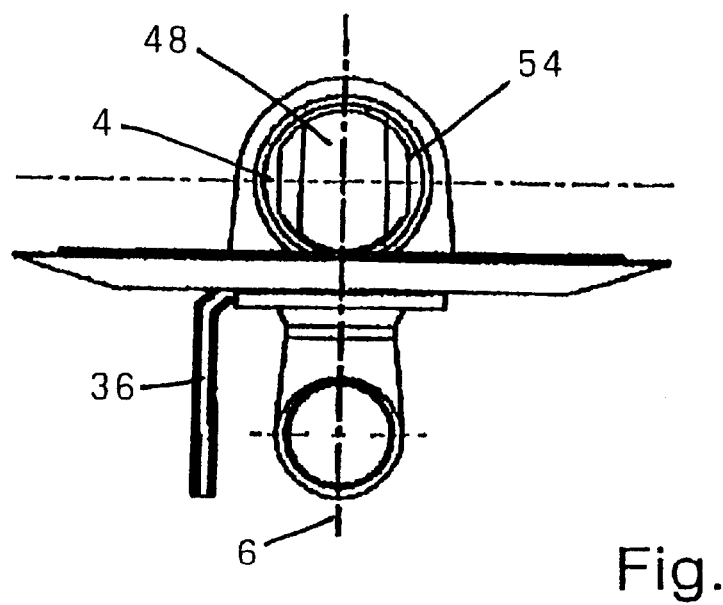

FIG. 3 shows a side view of the fitting in view direction III shown in FIG. 2, rotating body 4 being illustrated in the passage position and through opening 48 therefore running coaxially to longitudinal axis 6. Large second inflow opening 54 may also be seen easily here.

Figure 4:
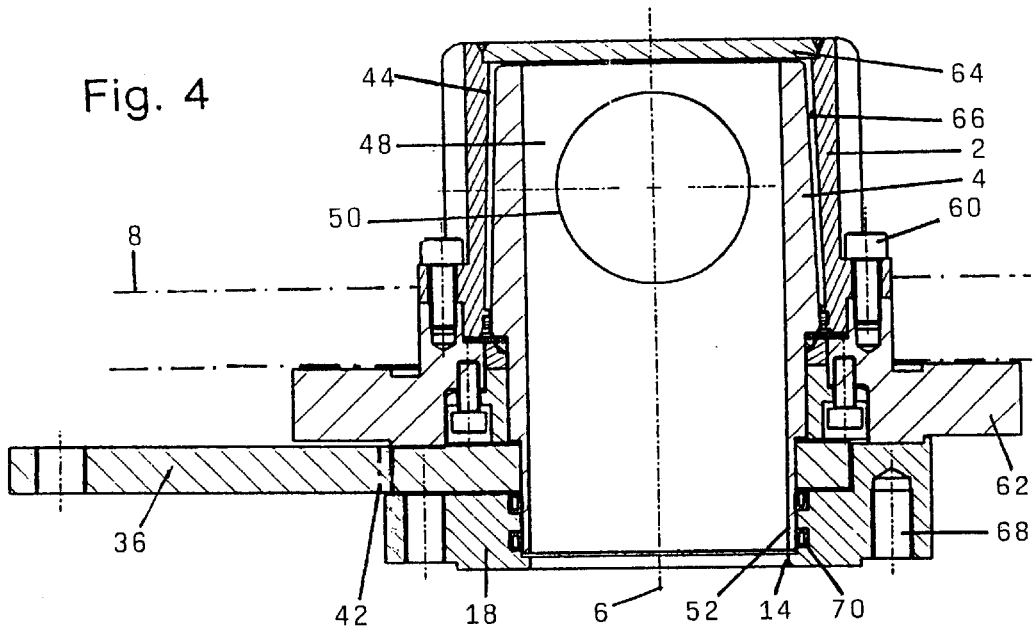
FIG. 4 is a sectional view through a further illustrative embodiment.

FIG. 4 shows a separate embodiment of the fitting, which is again constructed as a plug cock, having a rotating body and/or plug 4 which is rotatable around longitudinal axis 6, which therefore simultaneously also forms the rotational axis. Housing 2, which partially projects into the interior of the receptacle having bottom 8, contains a lower part 62, connected using screws 60, having a flange for connection to bottom 8 and, further above, a cover 64. To operate and/or rotate rotating body 4, lever 36, which has predetermined breaking point 42, indicated with a broken line, is connected thereto so that they rotate together. Housing 2 contains conical hole 44 inside, whose cone angle opens toward the bottom and/or in the direction toward lower part 62 and/or toward lever 36. The same also applies for the conical outer surface of plug 4, conical annular gap 66 between plug 4 and housing 2 being easily seen here. A bushing for mounting and/or sealing in the region of conical annular gap 66 is also not present in this embodiment. Using lower part 62, which is advantageously constructed as a housing flange, connection body 18, which is preferably constructed as a pipe flange and advantageously contains threaded holes 66 for connection to a correspondingly constructed flange of a pipeline or the like, is positioned on the lower side. Rotating body 4 projects up into the region of connection body 18, and the seal to the outside is produced using at least one, and preferably two, sealing rings 70, which are particularly constructed as delta rings. Rotating body 4 contains first inflow opening 50 and the second inflow opening is provided diametrically opposite thereto, in front of the plane of the drawing. The two inflow openings discharge into internal passage 48 of rotating body 4. Passage 48 preferably is constructed as a through hole and having outflow opening 52 at the bottom, whose cross-sectional area and/or radius is essentially equally as large as in outlet opening 14 in connection body 18 of housing 2.

Figure 5:
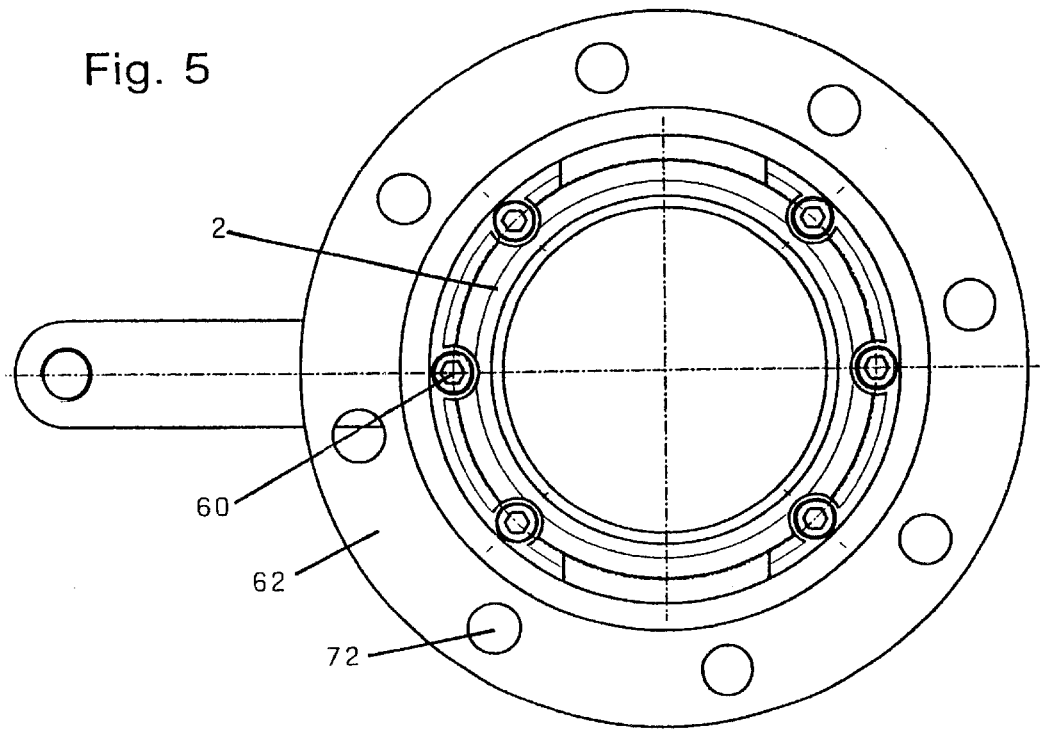
FIG. 5 is a further view of the fitting of FIG. 4.

FIG. 5 shows a top view of the fitting having housing 2, which is connected to lower part 62 using screws 60. Lower part 62 is constructed as a housing flange and contains through holes 72 for connection to the bottom of the receptacle.

Figure 6:
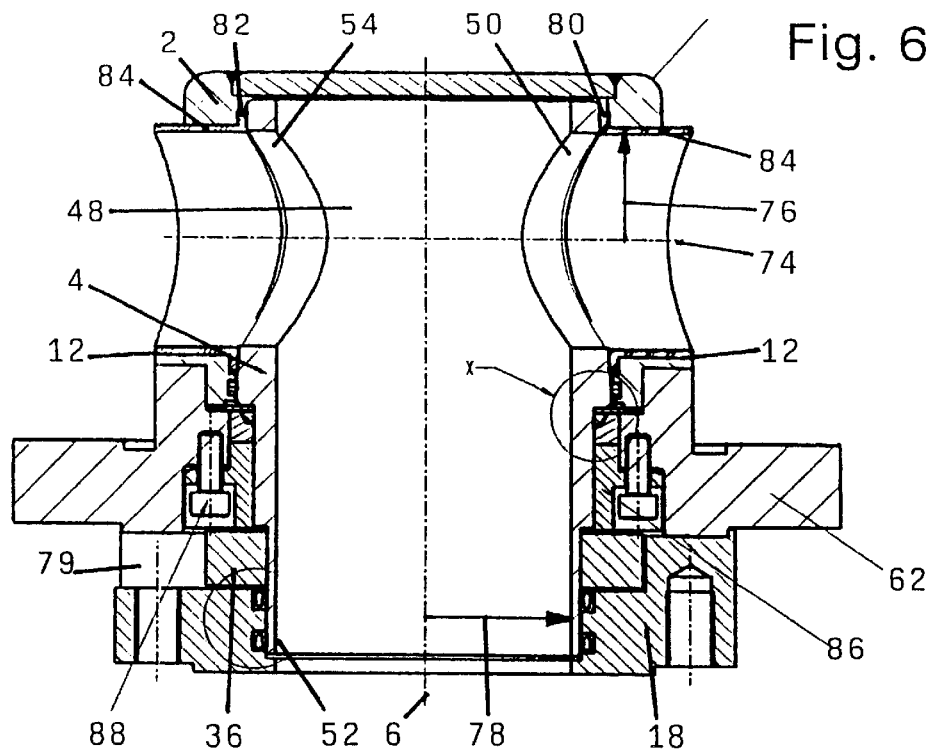
FIG. 6 is a sectional view through the fitting of FIG. 4.

FIG. 6 shows a section through the fitting shown in FIG. 4 in a position rotated by 90° in relation to longitudinal axis 6. In this case, both first inflow opening 50 and second inflow opening 54 of rotating body 4 may be easily seen. Both inflow openings 50, 54 are diametrically opposed and lie coaxially in relation to a common axis 74, which extends essentially orthogonal to longitudinal axis 6. Both inflow openings 50 and 54 are advantageoulsy a component of a through hole through rotating body 4 transverse to its rotational and longitudinal axis 6. Both inflow openings 50 and 54 advantageously have equally large radii 76. Outflow opening 52 has radius 78. Radii 76, on one hand, and radius 78, on the other hand, are selected in such a way that the sum of the cross-sectional areas of both inflow openings 50, 54 is at least approximately as large as the cross-sectional area of outflow opening 52 and/or of passage 48, which is advantageously constructed as a through hole. In the open position, the fluid or medium may thus flow through rotating body 4, and the fitting as a whole, unhindered and without a reduction of cross-section. Since radii 76 of transverse inflow openings 50, 54 are therefore selected as comparatively small, the overall height, in the direction of longitudinal axis 6 of the fitting, is correspondingly selected to be relatively low. A free space 79 to receive lever 36 is provided between lower part 62 and connection body 18.

In the closed position of rotating body 4, which assumes a position rotated by 90° in relation to rotational and longitudinal axis 6 in relation to the open position illustrated in FIG. 6, a preferably soft-sealing seat ring 80, 82 is positioned for sealing in the region of each of the conical ring gaps described between rotating body 4 and housing 2. Both seat rings 80, 82 are positioned in the vicinity of the inner surface of housing 2, so they are conically and/or spherically curved in correspondence with the conical outer surface of rotating body 4. Seat rings 80, 82 are each components of preferably cylindrical bushings 84, inserted into inlet openings 12, which are transverse to rotational axis 6 and are diametrically opposed. By integrating seat rings 80, 82 in respective bushings 84 and fixing them in diametrically opposed inlet openings 12, secure fixation in housing 2 is ensured. The manufacture and the installation of seat rings 80, 82 integrated in both bushings 84 may therefore be performed easily. It is of particular significance that the radii of inlet openings 12 and/or of the inner surfaces of bushings 84 are at least approximately as large as radii 76 of assigned inflow openings 50, 54. Since therefore the corresponding cross-sectional areas essentially correspond, there is no reduction of cross-section and/or increase of the flow resistance. Seat rings 80, 82, as well as associated bushings 84, are again made of synthetic resin material, i.e. plastic, particularly polytetrafluoroethylene.

In the housing and/or its lower part or housing flange 62, a clamping ring 86 is also provided, which is fixed using screws 88. Clamping ring 86 is positioned coaxially to axis 6 and is preferably also used for mounting rotating body 4.

Figure 7:
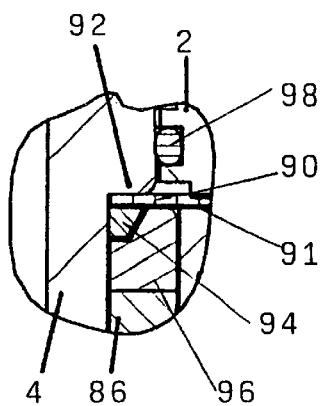
FIG. 7 is an enlarged detail view of the area X from FIG. 6.

FIG. 7 shows an enlargement of detail X shown in FIG. 6, rotating body 4 and clamping ring 86, the housing, and its lower part 62 being partially illustrated. Membranes 90 and 91 are clamped between housing 2 and lower part 62. Membrane 90 is constructed as soft-sealing and is made of synthetic resin material, particularly polytetrafluoroethylene, while membrane 91 is constructed as a steel membrane. Membranes 90 and 91 are constructed in annular shape, and their radial internal edge presses against an annular shoulder of the rotating body. A sealing ring 94, which is preferably constructed as a delta ring and also presses against the outer surface of rotating body 4 to form a seal, presses against the other side of the edge of membrane 90 described. Furthermore, a preferably ring-shaped clamping body 96 is positioned axially between clamping ring 86 and membrane 90. A sealing ring 98, which is preferably constructed as a U-ring, is also positioned between rotating body 4 and housing 2. In connection with FIG. 6, it is apparent that, using screws 88, clamping ring 86 is axially adjustable and consequently the axial position of rotating body 4 and the sealing pressure of seat rings 80, 82 may be adjusted via clamping body 96 and membrane 90. The described adjustment on a fitting installed in the receptacle thus can be performed without difficulty from outside the receptacle.

Figure 8:
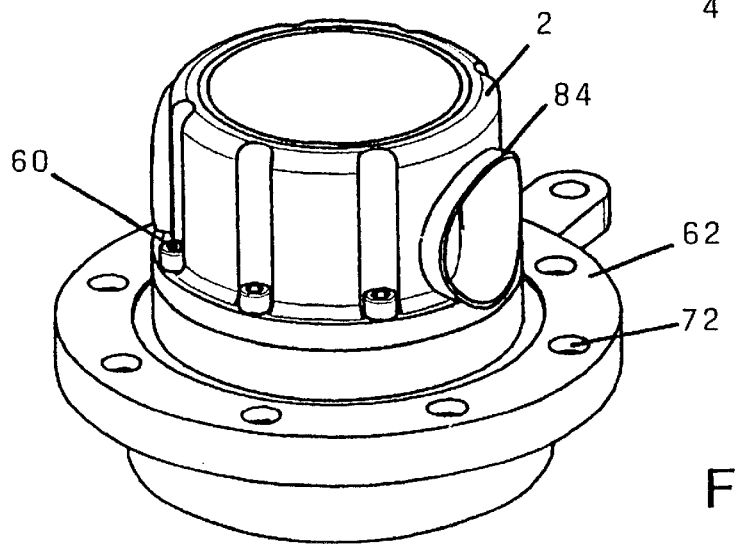
FIG. 8 is a perspective view of the fitting of FIGS. 4 through 7.

Finally, FIG. 8 shows a perspective illustration of the fitting shown in FIGS. 4 to 7 having housing 2 and one bushing 84. Housing 2 is connected to lower part or threaded flange 82, which contains through holes 72 for attachment to the outside of the bottom of the receptacle, using screws 60.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A fitting for a fluid receptacle, said fitting comprising a housing having two inlet openings and an outlet opening, and a rotatable body rotatably disposed in said housing, said rotatable body having a through passage with two inflow openings and an outflow opening, and said rotatable body when rotated into an open position, communicating the inlet openings with the outlet opening, and when in a closed position, blocking communication between the inlet openings and the outlet opening; said two inflow openings having cross-sections which are at least approximately equally large, and said housing having a bearing ring in the vicinity of the second inflow opening or a seat ring in the vicinity of the second inlet opening; wherein said rotatable body is constructed as a plug having a conical outer surface, and a predetermined small annular gap exists between the plug outer surface and an associated conical inner surface of a hole in the housing in which the plug is inserted; said housing having a seat ring in the vicinity of the outlet opening, against which seat ring the conical outer surface of the rotating body presses against to form a seal; wherein an axial adjustment of the rotatable body and consequent adjustment of the sealing pressure of the seat ring is controlled by adjustment of a clamping ring after the fitting is installed in the receptacle, and wherein the adjustment of the clamping ring is performable outside of the receptacle.

2. A fitting according to claim 1, wherein said housing also has a second seat ring in the vicinity of the first inlet opening, wherein the conical outer surface of the rotating body presses against both seat rings to form a seal, and wherein the sealing pressure of both seat rings is controlled by the adjustment of the clamping ring.

3. A fitting according to claim 1, wherein the housing outlet opening has a cross-sectional area which is at least approximately as large as the sum of cross-sectional areas of the two inflow openings of the rotating body.

4. A fitting according to claim 1, wherein the housing outlet opening has a cross-sectional area which is at least approximately as large as the sum of cross-sectional areas of the two inlet openings of the housing.

5. A fitting according to claim 1, further comprising a lever connected to said rotatable body for rotating the rotatable body, said lever having a predetermined breaking point.

6. A fitting according to claim 5, wherein the lever for rotating the rotatable body is arranged under the housing.

7. A fitting according to claim 5, wherein the lever for rotating the rotatable body is arranged in a free space between the housing and a connection body connected to said housing.

8. A fitting according to claim 1, further comprising a connection body positioned exteriorly of said housing adjacent said outlet opening; said connection body having a predetermined breaking point.

9. A fitting according to claim 8, A further comprising a connecting piece joined to said connection body, wherein said predetermined breaking point is between said connection body and said connecting piece.

10. A fitting according to claim 9, wherein said connecting piece is a tee.

11. A fitting according to claim 1, wherein the two inflow openings of the rotatable body are positioned at least approximately diametrically opposite each other.

12. A fitting according to claim 1, wherein the two inflow openings of the rotatable body have a common axis which lies essentially orthogonal to the rotational axis of the rotatable body.

13. A fitting according to claim 1, wherein the seat rings are each integral components of bushings, which are positioned in the inlet openings of the housing.

14. A fitting according to claim 1, wherein the rotating body has an annular shoulder, and the clamping ring, which is axially adjustable from the outside, acts against said annular shoulder.

15. A fitting according to claim 14, wherein a clamping body, which is axially fixed radially on the outside in the housing, is positioned between the clamping ring and the annular shoulder.

16. A fitting according to claim 14, wherein a membrane, which is axially fixed radially on the outside in the housing, is positioned between the clamping ring and the annular shoulder.

17. A fitting according to claim 14, wherein a clamping body and a membrane, which are axially fixed radially on the outside in the housing, are positioned between the clamping ring and the annular shoulder.

* * * * *